(12) United States Patent
Zou et al.

(10) Patent No.: US 12,420,185 B2
(45) Date of Patent: Sep. 23, 2025

(54) VIRTUAL SCENE TRANSFORMATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Mingwei Zou, Shenzhen (CN); Xu Wang, Shenzhen (CN); Hengshun Zhan, Shenzhen (CN); Guanlin Huang, Shenzhen (CN); Qi Zhao, Shenzhen (CN); Jingxuan Chen, Shenzhen (CN); Ru Xiao, Shenzhen (CN); Zihan Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 272 days.

(21) Appl. No.: 18/213,564

(22) Filed: Jun. 23, 2023

(65) Prior Publication Data

US 2023/0330531 A1 Oct. 19, 2023

Related U.S. Application Data

(63) Continuation of application No. PCT/CN2022/092259, filed on May 11, 2022.

(30) Foreign Application Priority Data

Jun. 9, 2021 (CN) .......................... 202110641716.X

(51) Int. Cl.
*A63F 13/52* (2014.01)
*A63F 13/537* (2014.01)

(52) U.S. Cl.
CPC ............ *A63F 13/52* (2014.09); *A63F 13/537* (2014.09); *A63F 2300/308* (2013.01)

(58) Field of Classification Search
CPC .. A63F 13/52; A63F 13/537; A63F 2300/308; A63F 2300/6653; A63F 13/63
See application file for complete search history.

(56) References Cited

U.S. PATENT DOCUMENTS

| | | | | |
|---|---|---|---|---|
| 8,214,739 B2 * | 7/2012 | Yoritate | ................ | G06F 3/0485 715/730 |
| 8,699,857 B2 * | 4/2014 | Nonaka | .................. | H04N 23/63 386/280 |

(Continued)

FOREIGN PATENT DOCUMENTS

| | | |
|---|---|---|
| CN | 106502654 A | 3/2017 |
| CN | 106502670 A | 3/2017 |

(Continued)

OTHER PUBLICATIONS

China National Intellectual Property Administration (CNIPA) Office Action 1 for 202110641716.X Oct. 25, 2022 9 Pages (including translation).

(Continued)

*Primary Examiner* — Pegeman Karimi
(74) *Attorney, Agent, or Firm* — ANOVA LAW GROUP, PLLC

(57) ABSTRACT

A virtual scene transformation method includes: displaying a first virtual scene picture, the first virtual scene picture comprising a first scene model in a virtual scene, and the first virtual scene picture being about the virtual scene observed by a virtual object; while the virtual scene is observed by the virtual object, displaying a scene transformation when the virtual scene meets a scene transformation condition, the scene transformation including a first stage in which the first scene model is gradually deleted, and a second stage in (Continued)

which a second scene model is gradually generated in the virtual scene, the second stage lagging behind the first stage; and displaying a second virtual scene picture when the scene transformation is completed, the second virtual scene picture comprising the second scene model.

20 Claims, 9 Drawing Sheets

(56) References Cited

U.S. PATENT DOCUMENTS

| | | | | |
|---|---|---|---|---|
| 11,023,035 | B1* | 6/2021 | Atlas | G06F 3/014 |
| 2003/0142751 | A1* | 7/2003 | Hannuksela | H04N 19/142 |
| | | | | 375/E7.076 |
| 2004/0061791 | A1* | 4/2004 | Terada | H04N 5/265 |
| | | | | 348/231.2 |
| 2017/0340969 | A1* | 11/2017 | Lim | G06F 3/013 |
| 2019/0318542 | A1 | 10/2019 | Sai et al. | |

FOREIGN PATENT DOCUMENTS

| | | |
|---|---|---|
| CN | 106598558 A | 4/2017 |
| CN | 110478898 A | 11/2019 |
| CN | 113230652 A | 8/2021 |
| JP | 2010055638 A | 3/2010 |
| JP | 2019020832 A | 2/2019 |

OTHER PUBLICATIONS

The World Intellectual Property Organization (WIPO) International Search Report for PCT/CN2022/092259 Aug. 10, 2022 13 Pages (including translation).
"Bilibili""Star Shadow", Jun. 18, 2017 (Jun. 18, 2017).
The Japan Patent Office (JPO) Notice of Reasons for Refusal for Application No. 2023-556973 Oct. 29, 2024 15 Pages (including translation).
"New Super Mario Bros. U Live Play #1 [Live Broadcast]", YouTube, Jan. 12, 2020 (Jan. 12, 2020), https://www.youtube.com/watch?v=UTpx21N_5oM, mainly refer to 13:49-14:01 and 16:28-16:46.
"FF11 Odyssey (Sheol A) warp opening and how to get to the exit)", YouTube, Mar. 11, 2020 (Mar. 11, 2020), https://www.youtube.com/watch?v=c6C0eSD4Eqk, mainly see 2:08 to 2:22.
Korean Intellectual Property Office (KIPO) Request for the Submission of an Opinion 1 for Application No. 2023-7027218 Mar. 5, 2025 15 Pages (including translation).
"Michael Jackson's Moonwalker", Category: Classic games OneCoin, YouTube, Jan. 24, 2021 (Jan. 24, 2021), https://www.youtube.com/watch?v=RZJdUWRxq10.

* cited by examiner

VIRTUAL SCENE TRANSFORMATION METHOD AND APPARATUS, DEVICE, AND STORAGE MEDIUM

CROSS-REFERENCES TO RELATED APPLICATIONS

This application is a continuation application of PCT Patent Application No. PCT/CN2022/092259, entitled "VIRTUAL SCENE TRANSITION METHOD AND APPARATUS, DEVICE, STORAGE MEDIUM AND PROGRAM PRODUCT" and filed on May 11, 2022, which claims priority to Chinese Patent Application No. 202110641716.X, filed on Jun. 9, 2021 and entitled "VIRTUAL SCENE TRANSFORMATION METHOD AND APPARATUS, COMPUTER DEVICE, AND STORAGE MEDIUM", the entire contents of both of which are incorporated herein by reference.

FIELD OF THE TECHNOLOGY

The present disclosure relates to the field of virtual scene technologies, and in particular, to a virtual scene transformation method and apparatus, a device, a storage medium, and a program product.

BACKGROUND OF THE DISCLOSURE

At present, in an application program, a virtual scene is often constructed to provide a place for virtual objects controlled by a user to observe and perform activities.

In the related technology, after the user determines to enter a specified virtual scene, the user may control a virtual object to perform activities in the specified virtual scene, such as moving and interacting between virtual objects.

However, after the user enters the virtual scene, if the user intends to enter another virtual scene, the user needs to exit the current virtual scene, reselect a new virtual scene, and enter the new virtual scene, causing operations for virtual scene transformation to be relatively complicated, efficiency of human-computer interaction of the virtual scene transformation to be relatively low, and a feeling of discontinuity.

SUMMARY

Embodiments of the present disclosure provide a virtual scene transformation method and apparatus, a device, a storage medium, and a program product, which can implement virtual scene transformation in a single virtual game battle, simplify an operation process of the virtual scene transformation, and improve efficiency of the virtual scene transformation. The technical solution is as follows:

According to an aspect, a virtual scene transformation method is provided, including: displaying a first virtual scene picture, the first virtual scene picture including a first scene model in a virtual scene, and the first virtual scene picture being about the virtual scene observed by a virtual object controlled by the computer device; while the virtual scene is observed by the virtual object, displaying a scene transformation when the virtual game battle meets a scene transformation condition, the scene transformation including a first stage in which the first scene model is gradually deleted, and a second stage in which a second scene model is gradually generated, the second stage lagging behind the first stage; and displaying a second virtual scene picture when the scene transformation is completed, the second virtual scene picture including the second scene model.

According to another aspect, a virtual scene transformation apparatus is provided, including: a first picture display module, configured to display a first virtual scene picture, the first virtual scene picture including a first scene model in a virtual scene, and the first virtual scene picture being about the virtual scene observed by a virtual object controlled by the apparatus; a second picture display module, configured to while the virtual scene is observed by the virtual object, display a scene transformation when the virtual game battle meets a scene transformation condition, the scene transformation including a first stage in which the first scene model is gradually deleted, and a second stage in which a second scene model is gradually generated, the second stage lagging behind the first stage; and a third picture display module, configured to display a second virtual scene picture when the scene transformation is completed, the second virtual scene picture including the second scene model.

According to another aspect, a computer device is provided, including a processor and a memory, the memory storing at least one instruction, at least one program, a code set, or an instruction set, the at least one instruction, the at least one program, the code set, or the instruction set being loaded and executed by the processor to implement the foregoing virtual scene transformation method.

According to another aspect, a non-transitory computer-readable storage medium is provided, storing at least one computer program, the computer program being loaded and executed by a processor to implement the foregoing virtual scene transformation method.

The technical solutions provided in the present disclosure may include the following beneficial effects:

In the same virtual game battle, when a virtual game battle meets a scene transformation condition, a currently displayed scene model is first gradually deleted, and during a process in which the currently displayed scene model is deleted or after the currently displayed scene model is deleted, a new scene model is gradually generated to display a new virtual scene picture. Therefore, when needing to transform a virtual scene, a user does not need to end the current virtual game battle and reselect a virtual scene type, which implements virtual scene transformation in a single virtual game battle, improves diversity of virtual scene display in the single virtual game battle, simplifies an operation process of the virtual scene transformation, and improves efficiency of human-computer interaction of the virtual scene transformation.

DESCRIPTION OF EMBODIMENTS

Figure 1:
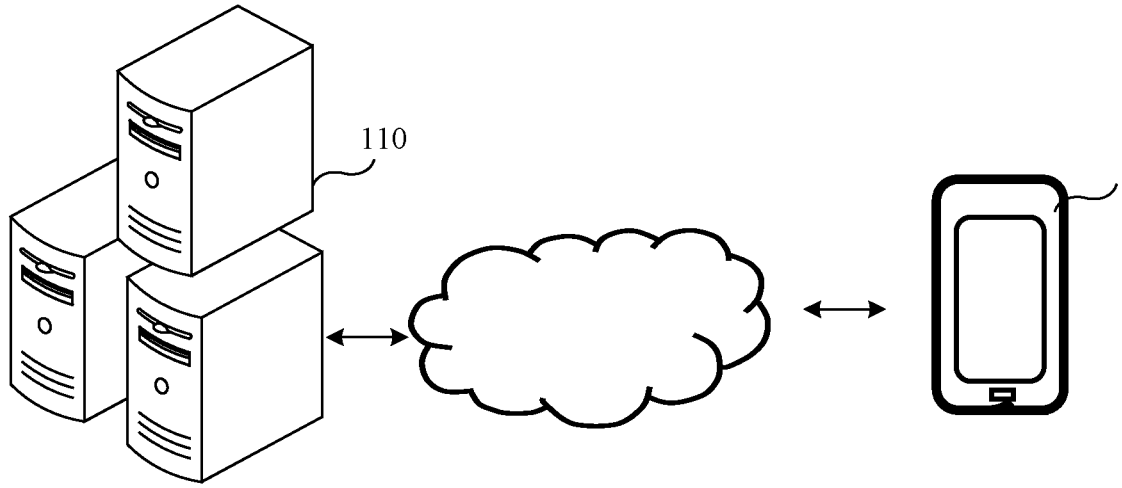
FIG. 1 is a schematic diagram of a system structure used in a virtual scene transformation method according to an exemplary embodiment of the present disclosure.

FIG. 1 is a schematic diagram of a system structure used in a virtual scene transformation method according to an exemplary embodiment of the present disclosure. As shown in FIG. 1, the system includes: a server 110 and a terminal 120.

An application program supporting a virtual engine is installed in the terminal 120, and a virtual scene picture is displayed in the application program through the virtual engine, the virtual scene picture being a picture corresponding to a virtual scene obtained through simulation and construction by the virtual engine. Exemplarily, the application program may be implemented as a game, a cloud game, an instant messaging application program, a shopping program, a social application program, and the like. This is not limited in this embodiment. The server 110 is configured to send interface display data to the terminal 120, so that the terminal 120 displays the virtual scene picture according to the interface display data.

In some embodiments, when the terminal 120 displays the virtual scene picture of a virtual game battle, the virtual scene picture is switched to be displayed as the virtual scene changes, where virtual objects in the virtual scene and terrain in the virtual scene are gradually transformed during virtual scene switching. In some embodiments, a first virtual scene picture is first displayed in the terminal 120, the first virtual scene picture including a first scene model. By gradually deleting the first scene model in the first virtual scene picture and gradually generating a second scene model, the first virtual scene picture is switched to a second virtual scene picture. In some embodiments, both deleting the first scene model and generating the second scene model in the terminal 120 are implemented in a form of slicing. For example, slicing is performed on the first scene model and slices are deleted from the virtual scene slice by slice in sequence; and slicing is performed on the second scene model and slices are added to the virtual scene in sequence, thereby completing transformation from the first virtual scene picture to the second virtual scene picture.

The server 110 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform, or may be a node server on a blockchain network.

The terminal 120 may be a terminal having an interface display function, for example, the terminal 120 may be a smartphone, a tablet computer, an e-book reader, smart glasses, a smartwatch, a smart television, a smart in-vehicle device, a moving picture experts group audio layer III (MP3) player, a moving picture experts group audio layer IV (MP4) player, a laptop portable computer, a desktop computer, or the like.

In some embodiments, the system includes one or more servers 110 and a plurality of terminals 120. The numbers of the servers 110 and terminals 120 are not limited in this embodiment of the present disclosure.

The terminal and the server are connected through a communication network. In some embodiments, the communication network is a wired network or a wireless network.

Figure 2:
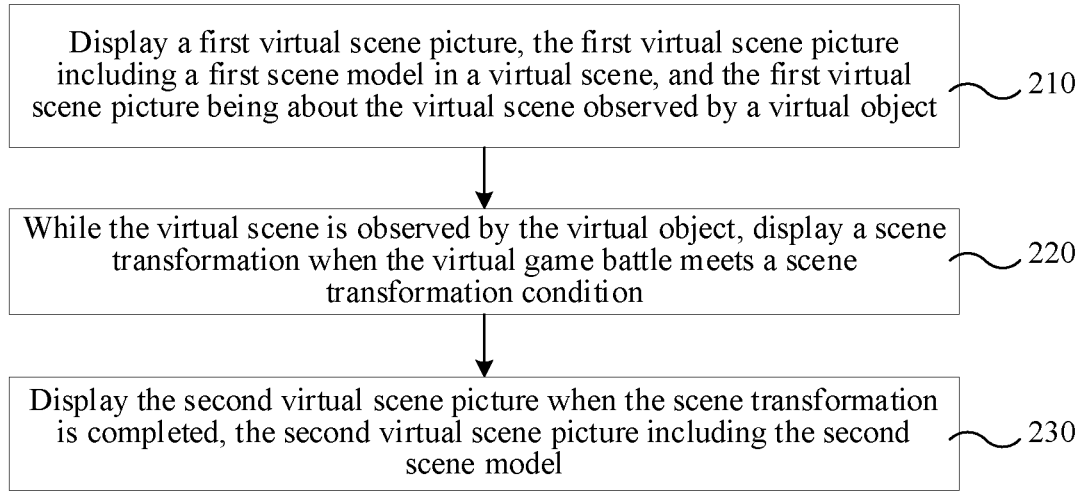
FIG. 2 is a flowchart of a virtual scene transformation method according to an exemplary embodiment of the present disclosure.

FIG. 2 is a flowchart of a virtual scene transformation method according to an exemplary embodiment of the present disclosure. The method is performed by a computing device, which may be implemented as a terminal, and the terminal may be the terminal 120 shown in FIG. 1. As shown in FIG. 2, the virtual scene transformation method includes the following steps:

Step 210. Display a first virtual scene picture, the first virtual scene picture including a first scene model in a virtual scene, and the first virtual scene picture being about the virtual scene observed by a virtual object. The virtual object is controlled by the computing device (e.g., based on user operation and/or game logic).

In some embodiments, the virtual game battle includes a first camp and a second camp.

A virtual scene is a virtual scene displayed (or provided) by an application program when run on a terminal. The virtual scene may be a simulated environment scene of a real world, or may be a semi-simulated semi-fictional three-dimensional environment scene, or may be an entirely fictional three-dimensional environment scene. The first scene model is a model forming the first virtual scene picture, and the first scene model may be used for representing a non-control object in the first virtual scene picture. The non-control object may be an object in the virtual scene that the user cannot control, for example, the non-control object may include terrain, a building, a facility, and the like. The terrain represents shapes of objects, landform, and the like in the virtual scene, including a road surface, high and low slopes, water, vegetation, and the like. The first virtual scene picture is a picture to be transformed into the second virtual scene picture, that is, in the scene transformation of the virtual game battle, the virtual scene corresponding to the first virtual scene picture is transformed into a virtual scene corresponding to the second virtual scene picture. Switching between scenes is implemented by transforming the scene model in the virtual scene.

In some embodiments, the virtual scene is used for a virtual scene fight between at least two virtual characters. In some embodiments, the virtual scene may also be used for fighting with virtual guns between at least two virtual characters. In some embodiments, the virtual scene may also be used for fighting with virtual guns between at least two virtual characters in a target area range, the target area range continuously becoming smaller as time passes in the virtual scene.

The virtual scene is usually generated by an application program in a computer device such as a terminal, and is displayed based on hardware (such as a screen) in the terminal. The terminal may be a mobile terminal such as a smartphone, a tablet computer, or an e-book reader. Alternatively, the terminal may be a personal computer device such as a notebook computer or a stationary computer.

The virtual game battle is used for indicating that in the virtual scene, a specified task is completed by controlling interaction between the virtual object and a virtual environment or another virtual object, and the same virtual game battle may include the first camp and the second camp. The second camp is used for indicating another camp except the first camp. The first camp and the second camp may be opposing camps or may be allied camps. Each camp may include at least one virtual object. When the virtual game battle is a player versus environment (PVE) type, a camp including the virtual object controlled by a user may be considered as the first camp, and a camp including a virtual object that cannot be controlled by the user may be considered as the second camp. When the virtual game battle is a player versus player (PVP) type, virtual objects controlled by different users may be in different camps, and the different camps may be opposing camps or allied camps.

Step 220. While the virtual scene is observed by the virtual object, display a scene transformation when the virtual game battle meets a scene transformation condition.

The scene transformation includes a first stage in which the first scene model is gradually deleted, and a second stage in which a second scene model is gradually generated. The second stage lags behind the first stage. For example, a starting moment of the first stage is earlier than a starting moment of the second stage.

That is, a virtual animation picture correspondingly displays a process in which the first scene model is gradually deleted and a process in which the second scene model is gradually generated, where a starting moment at which the first scene model is deleted is earlier than a starting moment at which the second scene model is generated. That is, the process in which the first scene model is gradually deleted and the process in which the second scene model is gradually generated are not triggered at the same time. Exemplarily, during scene switching, the second scene model starts to be generated after a certain time interval from a moment at which the first scene model starts to be deleted, or the second scene model may be gradually generated after the first scene model is deleted. The foregoing two example implementations depend on a length of the time interval between the starting moment at which the first scene model is deleted and the starting moment at which the second scene model is generated. When the time interval is less than a first time length required for gradually deleting the first scene model from near (e.g., near the virtual object) to far (e.g., further away from the virtual object), the second scene model is gradually generated in the process in which the first model is gradually deleted. When the time interval is greater than the first time length, the second scene model is gradually generated after the first scene model is gradually deleted.

The length of the time interval between the starting moment at which the first scene model is deleted and the starting moment at which the second scene model is generated is preset, or the length of the time interval is randomly determined. This is not limited in this embodiment.

In one embodiment, a starting point at which the first scene model is gradually deleted coincides with a starting point at which the second scene model is generated, that is, generation/construction of the second scene model is performed based on completion of gradually deleting the first scene model.

The first virtual scene picture may be a scene picture displayed at any moment in the virtual game battle, and the second scene picture is a scene picture transformed from the first virtual scene picture in the virtual game battle. That is, the virtual scene transformation method provided in this embodiment of the present disclosure is applied to a scene in which scene transformation is performed in the same virtual game battle, to complete the virtual scene transformation in the same virtual game battle.

In some embodiments, the first stage is an animation in which the first scene model is gradually deleted using a specified position as a starting position; and the second stage is an animation in which the second scene model is gradually generated using the specified position as the starting position. In some embodiments, the specified position may be a position where the virtual object is located, or a center of a field of view of the virtual object.

In some embodiments, when the first scene model is gradually deleted and the second scene model is gradually generated using the specified position as the starting position, any one of the following situations is included:

1. The first scene model is deleted and the second scene model is generated by using the specified position as a center to diffuse outward in a circular range.
2. The first scene model is deleted and the second scene model is generated by using the specified position as the starting position to expand in a rectangular range in a specified direction, that is, an edge in which the specified position is located is used as a fixed edge of a rectangle to expand a coverage of the rectangular range in a form of extending a side edge of the fixed edge, and the first scene model is deleted and the second scene model is generated as the coverage of the rectangular range expands.
3. The first scene model is deleted and the second scene model is generated by using the specified position as the starting position and a specified included angle as a diffusion included angle to expand in a fan-shaped range in the specified direction.

The diffusion manner of using the specified position as the starting position is only a schematic example. This is not limited in this embodiment of the present disclosure.

Step 230. Display the second virtual scene picture when the scene transformation is completed, the second virtual scene picture including the second scene model.

That is, after the scene transformation is completed, the first scene model in the virtual scene is switched into the second scene model, to construct a new virtual scene and display the second virtual scene picture. The second virtual scene picture is a picture corresponding to the virtual scene constructed by the second scene model.

In summary, in the virtual scene transformation method provided in this embodiment of the present disclosure, in the same virtual game battle, when the virtual game battle meets the scene transformation condition, the currently displayed scene model is first gradually deleted, and during a process in which the currently displayed scene model is deleted or after the currently displayed scene model is deleted, a new scene model is gradually generated to display a new virtual scene picture. Therefore, when needing to perform virtual scene transformation, a user does not need to end the current virtual game battle and reselect a virtual scene type, which implements the virtual scene transformation in a single virtual game battle, improves diversity of virtual scene display in the single virtual game battle, simplifies an operation process of the virtual scene transformation, and improves efficiency of human-computer interaction of the virtual scene transformation.

In addition, in the virtual scene transformation method provided in this embodiment, the process in which a first scene model is gradually deleted and the process in which a second scene model is gradually generated are displayed in the virtual game battle, to transform the virtual scene, which avoids the need for the user to frequently select different virtual scenes by performing human-computer interaction operations, and also avoids the need for the terminal to obtain scene data for display in response to the selection of the user for multiple times, thereby reducing the data processing amount of the terminal and reducing the human-computer interaction response amount of the terminal.

Figure 3:
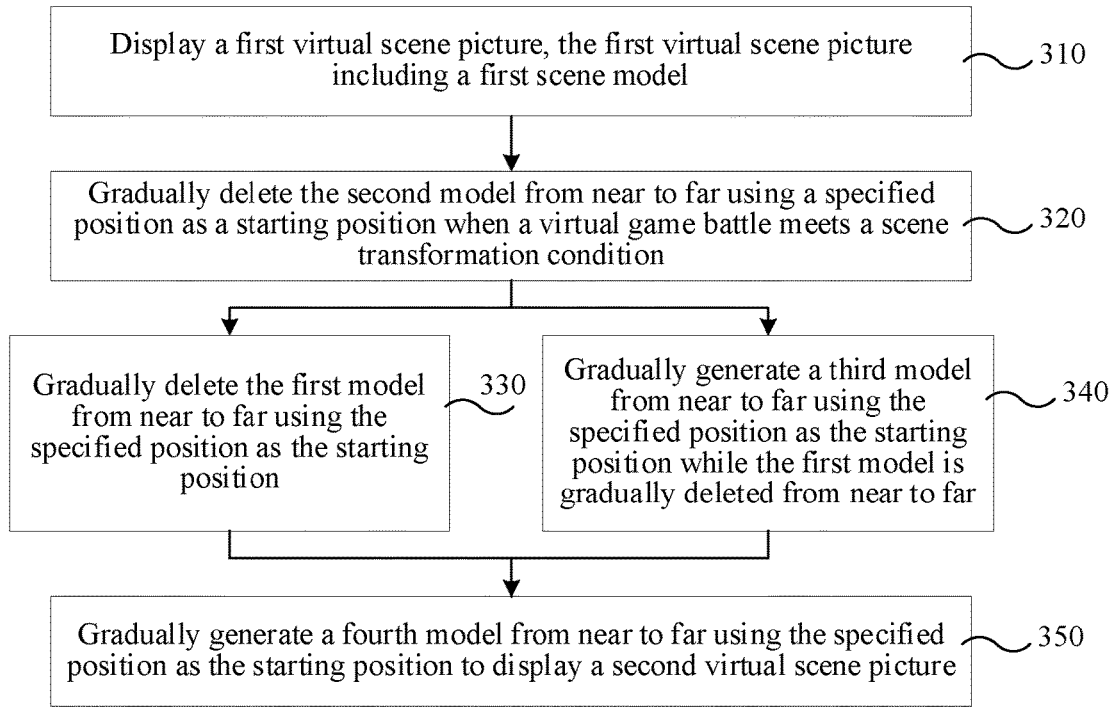
FIG. 3 is a flowchart of a virtual scene transformation method according to an exemplary embodiment of the present disclosure.

In this embodiment of the present disclosure, scene models in the virtual scene picture may be divided into two types, one is a terrain model, including ground, a water surface, a depression, and the like, and the other is a model other than the terrain model, including a building, vegetation, and the like. In this case, FIG. 3 is a flowchart of a virtual scene transformation method according to an exemplary embodiment of the present disclosure. The method is executed by a computer device, which may be implemented as a terminal, and the terminal may be the terminal 120 shown in FIG. 1. As shown in FIG. 3, the virtual scene transformation method includes the following steps:

Step 310. Display a first virtual scene picture, the first virtual scene picture including a first scene model in a virtual scene.

In some embodiments, the first virtual scene picture is a scene picture in a virtual game battle and about the virtual scene observed by a virtual object.

In some embodiments, the virtual game battle includes a first camp and a second camp.

Figure 4:
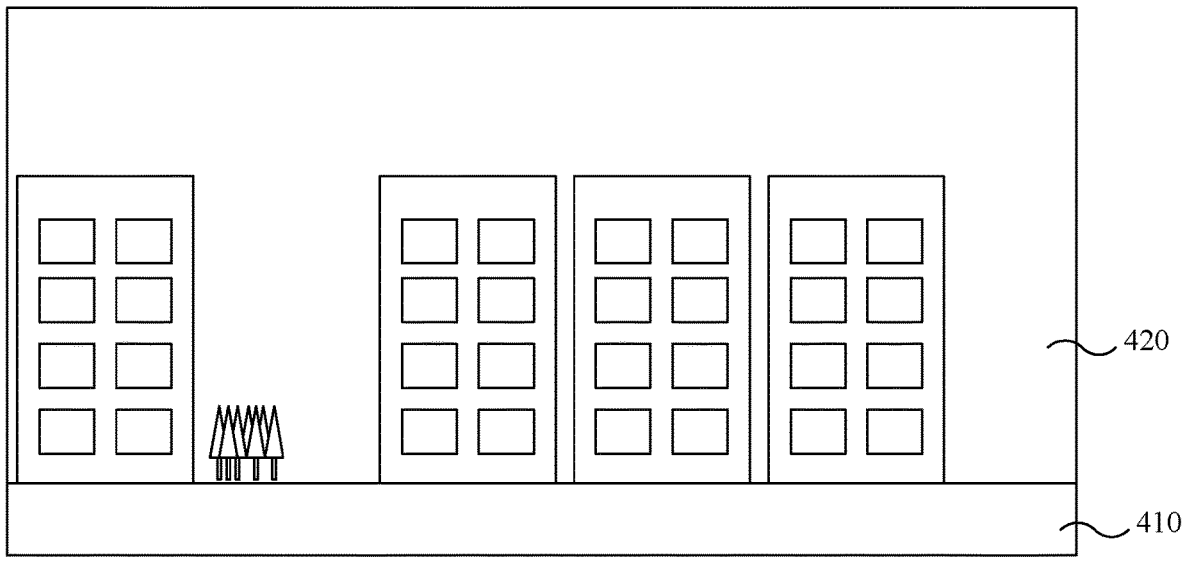
FIG. 4 is a schematic diagram of a first virtual scene picture shown in an exemplary embodiment of the present disclosure.

In some embodiments, the first scene model includes a first model and a second model. The first model is a terrain model, and the second model is a model other than the terrain model. FIG. 4 is a schematic diagram of a first virtual scene picture shown in an exemplary embodiment of the present disclosure. As shown in FIG. 4, the first virtual scene picture is formed by a first scene model in a virtual scene picture. The first scene model may be divided into two types, one is a terrain model (a first model) 410, and the other is models (a second model) 420 located above ground other than the terrain model, for example, a building model shown in FIG. 4.

Step 320. Gradually delete the second model from near to far using a specified position as a starting position when a virtual game battle meets a scene transformation condition. For example, the first stage of scene transformation comprises deletion processes of the first and second models being gradually deleted from near to far from a specified position, the deletion process of the first model lagging behind the deletion process of the second model.

In one embodiment, the scene transformation includes a first stage in which the first scene model is gradually deleted from near to far using the specified position as the starting position, and a second stage in which the second scene model is generated from near to far using the specified position as the starting position. Alternatively, the virtual animation picture includes a first stage in which the first scene model is gradually deleted from outside to inside, and a second stage in which the second scene model is generated from outside to inside. A deletion manner of the first scene model and a generation manner of the second scene model are not limited in the present disclosure, but generation of the second scene model needs to be performed based on a deletion result of the first scene model.

When the virtual game battle meets the scene transformation condition, the virtual scene is triggered to be transformed from the first virtual scene to the second virtual scene, and correspondingly, the virtual scene picture is transformed from the first virtual scene picture to the second virtual scene picture. In some embodiments, the first virtual scene and the second virtual scene may be implemented as complete virtual scenes, or may be implemented as partial regions in a complete virtual scene. This is not limited in this embodiment.

In this embodiment of the present disclosure, the virtual scene transformation method provided in the present disclosure is described by using an example in which the first scene model is gradually deleted from near to far and the second scene model is generated from near to far, using the specified position as the starting position. The specified position may be a specified position point in a preset virtual scene. For example, the specified position may be a center point of an overall modeling of the virtual scene, or the specified position may be a center point of a scene picture displayed by a screen, or the specified position may be a position point in which a virtual object controlled by a user is located, or the specified position may be any point in the overall modeling of the specified virtual scene. A position of a specified origin is not limited in the present disclosure.

The gradual deletion from near to far may refer to that the first scene model is gradually deleted from near to far in a specified diffusion manner using the specified position as the starting position. Correspondingly, the gradual generation from near to far may refer to that the second scene model is gradually generated from near to far in the specified diffusion manner using the specified position as the starting position. Using a three-dimensional virtual scene as an example, the specified diffusion manner may be a spherical diffusion manner, or the specified diffusion manner may be a triangular conical diffusion manner, or the specified diffusion manner may be any three-dimensional diffusion manner set by relevant personnel. This is not limited in the present disclosure. Using a two-dimensional virtual scene as an example, the specified diffusion manner may be a circular diffusion manner, or the specified diffusion manner may be a square diffusion manner, or the specified diffusion manner may be any two-dimensional diffusion manner set by relevant personnel. This is not limited in the present disclosure.

That is, the first stage includes a scene in which the second model is gradually deleted from near to far using the specified position as the starting position.

In one embodiment, before the virtual game battle meets the scene transformation condition and the second model is gradually deleted from near to far using the specified position as the starting position, whether the virtual game battle meets the scene transformation condition also needs to be determined, that is, whether the virtual scene transformation is triggered needs to be determined. In other words, before the virtual game battle meets the virtual scene picture condition and the virtual animation picture is displayed, whether the virtual game battle meets the scene transformation condition also needs to be determined. The present disclosure provides the following example situations:

1. It is determined that the virtual game battle meets the scene transformation condition when a running duration of the virtual scene corresponding to the first virtual scene picture reaches a duration threshold. That is, in the current virtual game battle, when a running duration of a virtual scene corresponding to a virtual scene picture reaches the duration threshold, the virtual scene transformation may be triggered, where the first virtual scene picture refers to a picture corresponding to a virtual scene of a first type. For example, the first virtual scene picture is a scene picture of a desert type. When a running duration of a virtual scene corresponding to the scene picture of a desert type reaches the duration threshold, the virtual scene transformation is triggered. The virtual scene in the current virtual game battle may be transformed into any one of virtual scenes of types, such as tropical rainforest type, city type, interstellar type, and snow field type. The scene picture corresponding to the transformed virtual scene of a type, that is, the second virtual scene picture, is displayed. The foregoing descriptions of the type of the virtual scene picture are only exemplary. This is not limited in the present disclosure.

2. It is determined that the virtual game battle meets the scene transformation condition when the virtual object completes a specified task, the virtual object being used for indicating a movable object in the virtual scene. The specified task is used for triggering the transformation of the virtual scene in the virtual game battle. Exemplarily, when the virtual object collects 10 map fragments to unlock a new virtual scene, it is determined that the virtual game battle meets the scene transformation condition, and the virtual scene transformation is triggered. The specified task may be represented in different implementation forms based on different settings of relevant personnel, and is not limited in the present disclosure.

3. It is determined that the virtual game battle meets the scene transformation condition when a scene transformation control operation is received. The scene transformation control operation may be an operation triggered by a virtual object with a scene transformation skill. Alternatively, the scene transformation control operation is an operation triggered by a specified prop when the virtual object in the virtual scene obtains the specified prop. This is not limited in this embodiment.

That is, the scene transformation condition includes at least one of that the running duration of the virtual scene corresponding to the first virtual scene picture reaches the duration threshold, the virtual object completes the specified task, or the virtual object triggers the scene transformation control operation.

When the scene transformation condition is that when the virtual object completes the specified task, a type of the second virtual scene is determined by a camp that the virtual object completing the task is in. When the camp that the virtual object is in is a first camp, after the virtual object completes the specified task, the type of the second virtual scene is determined based on camp area distribution corresponding to the first camp, and the type of the second virtual scene helps the first camp to achieve victory of the virtual game battle. Exemplarily, after the virtual object in the first camp completes the specified task, the first virtual scene is transformed into the second virtual scene that has more virtual props in a distribution area of the first camp than in a distribution area of the second camp, or the first virtual scene is transformed into the second virtual scene that can provide bonuses for a specified attribute of the virtual object in the first camp to facilitate the first camp to achieve victory in the virtual game battle.

In some embodiments, the first stage includes propagation of a wave from near to far from a specified position. Gradually deleting the first scene model may include: determining a boundary based on the propagation of the wave, and deleting a slice of the first scene model reached by the boundary. In some embodiments, the wave may include at least one edge surface that propagates along a path originating from the specified position.

To visualize the process in which the second model is gradually deleted from near to far, and facilitate the user to perceive the process in which the second model is gradually deleted from near to far, in one embodiment, a first wave is displayed in the process in which the second model is gradually deleted from near to far. The first wave is used for indicating a first boundary, and the first boundary is a boundary between a picture part in which the second model is deleted and a picture part in which the second model is not deleted. That is, a virtual scene picture including the second model is displayed in a diffusion direction of the first wave, and a virtual scene picture not including the second model is displayed in an opposite direction of the diffusion direction of the first wave.

Exemplarily, gradual deletion of the model from near to far may be implemented as deletion of the model layer by layer, or gradual deletion from near to far in a slicing manner may be implemented as performing dissolution deletion on the model. The dissolution deletion refers to that the model is divided into several model fragments, and the model fragments are deleted according to a specified rule deleted randomly until the model deletion is completed. An expression form corresponding to the gradual deletion from near to far may be preset, and the expression form corresponding to the gradual deletion from near to far is not limited in the present disclosure. In this embodiment of the present disclosure, the virtual scene transformation method provided in the present disclosure is described by using an example in which the expression form of the gradual deletion from near to far is deletion layer by layer in a slicing manner.

In some embodiments, the first scene model may include a sub-model marked as undeletable, and the sub-model marked as undeletable may be preserved during the first stage of the scene transformation.

Figure 5:
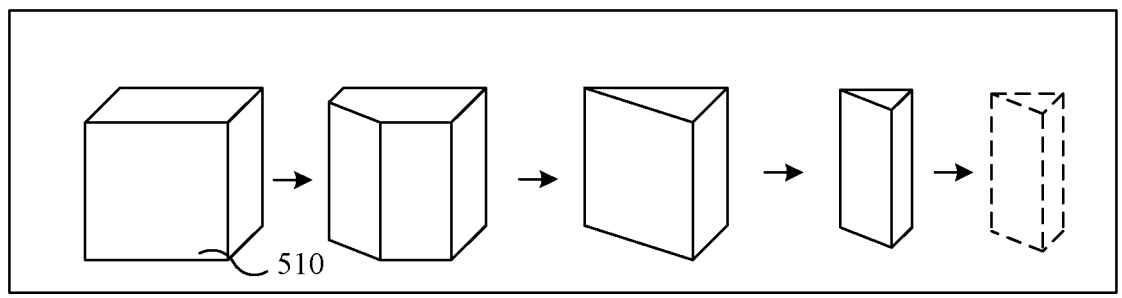
FIG. 5 is a schematic diagram of gradual deletion from near to far shown in an exemplary embodiment of the present disclosure.

In one embodiment, when the virtual scene transformation is triggered, the second model is deleted layer by layer at a first diffusion speed using the specified position as the starting position. FIG. 5 is a schematic diagram of gradual deletion from near to far shown in an exemplary embodiment of the present disclosure. As shown in FIG. 5, an example in which the virtual scene picture is a three-dimensional virtual scene picture is used. For a model 510 in the virtual scene picture, as the process of gradual deletion from near to far proceeds, a volume of the model 510 gradually decreases. During the gradual deletion from near to far, cut planes corresponding to different time points are parallel to each other, and a product of the first diffusion speed and a unit time is used for indicating a size of a range of the deleted model in the unit time.

A second model corresponds to a model other than a terrain model (a first model), and corresponds to a large number of model types and models. During virtual scene transformation, some models may be reserved based on an actual requirement. Exemplarily, the second model includes at least one sub-model.

The first sub-model is deleted layer by layer when the first sub-model meets a specified condition, and the first sub-model is in contact with a first wave. The first sub-model is one of the at least one sub-model. The specified condition is used for indicating that the sub-model is deletable.

Whether the sub-model is deletable can be indicated by adding a target identifier to the sub-model. Exemplarily, a deletion identifier can be added to the sub-model to indicate that the sub-model is deletable. Correspondingly, the sub-model to which a deletion identifier is not added is undeletable. Alternatively, a reservation identifier may be added to the sub-model to indicate that the sub-model is undeletable, and correspondingly, a sub-model to which a reservation identifier is not added is deletable.

When target identifiers are added to sub-models, the identifiers may be selectively added to the sub-models one by one, or, in one embodiment, target identifiers may be added in batches based on a model type, and the target identifiers may be deletion identifiers, or reservation identifiers. Exemplarily, the second model includes types such as a building model, a prop model, and a vegetation model. Assuming that the relevant personnel need to add target identifiers to a building model and a vegetation model but not to a prop model, all sub-models of the building model and the vegetation model can be batch selected based on model types, and the target identifiers are uniformly added to these sub-models, while the identifiers are not added to the prop model.

Figure 6:
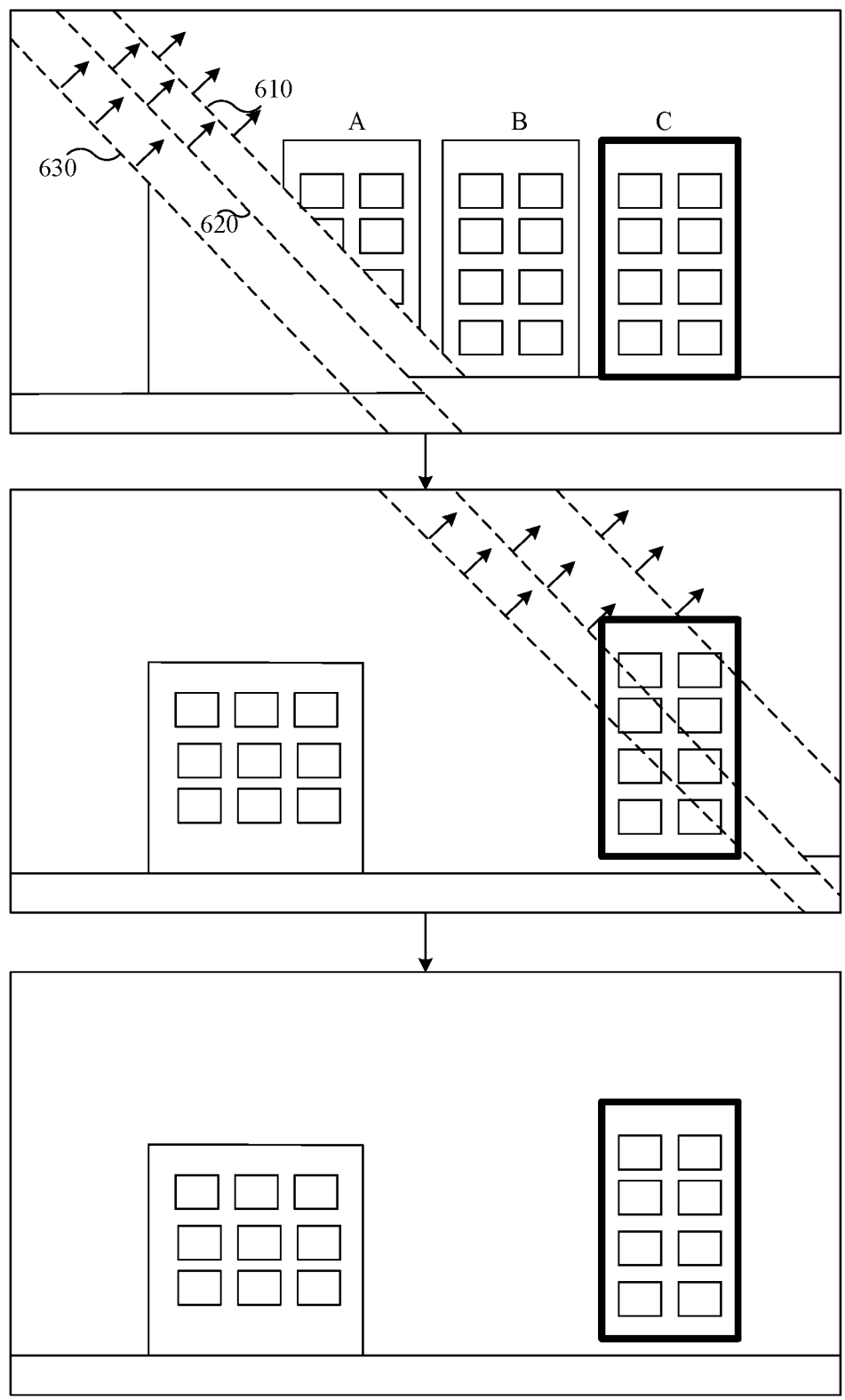
FIG. 6 is a schematic diagram of a deletion process of a second model shown in an exemplary embodiment of the present disclosure.

The second sub-model is reserved when the second sub-model is in contact with the first wave when the second sub-model does not meet the specified condition. The second sub-model is one of the at least one sub-model. FIG. 6 is a schematic diagram of a deletion process of a second model shown in an exemplary embodiment of the present disclosure. As shown in FIG. 6, three building models are included in the virtual scene picture. A reservation identifier (a black frame) is added to a building model C (a second sub-model). Accordingly, in the process in which the second model is deleted, when a building model A and a building model B are in contact with a first wave 610, the building model A and the building model B are deleted layer by layer, and when the first wave 610 is in contact with the building model C and the first wave 610 passes through the building model C, the building model C is not deleted layer by layer. That is, after the virtual scene transformation ends, model update is not performed at a corresponding coordinate position of the building model C in a virtual scene, and the building model C is still reserved.

That is, for scene picture transformation, the virtual animation picture includes a scene in which a first sub-model is deleted layer by layer when the first sub-model is in contact with a first wave. The first sub-model is a sub-model that meets the specified condition in the at least one sub-model. The specified condition is used for indicating that the sub-model is deletable.

In some embodiments, the first stage includes a picture in which the second sub-model is reserved when the second sub-model is in contact with the first wave. The second sub-model is a sub-model in the at least one sub-model that does not meet the specified condition.

Step 330. Gradually delete the first model from near to far using the specified position as the starting position.

That is, the first stage includes a scene in which the first model is gradually deleted from near to far using the specified position as the starting position.

A starting moment at which the second model is deleted is earlier than a starting moment at which the first model is deleted. When virtual scene transformation is triggered and the first scene model is gradually deleted from near to far, the first model and the second model may be deleted in stages. The second model starts to be deleted first, and then the second model starts to be deleted using the same specified position as the starting position. A first time interval exists between a first starting moment (a starting moment at which the second model is gradually deleted from near to far) and a second starting moment (a starting moment at which the first model is gradually deleted from near to far). When the first time interval is greater than a time length required to complete the deletion of the second model, the process is implemented as starting to delete the first model after deletion of the second model is completed. When the first time interval is less than the time length required to complete the deletion of the second model, the process is implemented as deleting the first model during deleting the second model.

In one embodiment, during the process in which the first model is gradually deleted from near to far, a second wave is displayed. The second wave is used for indicating a boundary between a picture part in which the first model is deleted and a picture part in which the first model is not deleted. That is, a virtual scene picture including the second model and the first model, or a virtual scene picture that does not include the second model but includes the first model is displayed in a diffusion direction of the second wave, and a virtual scene picture that does not include the first model is displayed in an opposite direction of the diffusion direction of the second wave.

In one embodiment, the first model is deleted layer by layer at a second diffusion speed using the specified position as the starting position. The second diffusion speed is less than or equal to the first diffusion speed, to ensure that the layer-by-layer deletion operation on the first model and the layer-by-layer deletion operation on the second model are performed sequentially. As shown in FIG. 6, a diffusion speed of the second wave 620 is less than a diffusion speed of the first wave 610.

Corresponding to scene display, the virtual animation picture includes a scene in which the second model is deleted layer by layer at the first diffusion speed and a scene in which the first model is deleted layer by layer at the second diffusion speed, using the specified position as the starting position. The second diffusion speed is less than or equal to the first diffusion speed.

In some embodiments, the virtual animation picture includes the first wave and the second wave. When the first wave reaches a specified range, deletion of the second model is stopped, and the first wave disappears; and when the second wave reaches the specified range, deletion of the first model is stopped, and the second wave disappears. That is, during scene transformation, the first wave and the second wave are displayed in sequence and disappear in sequence.

In some embodiments, the second model is deleted slice by slice from near to far in a form of slicing, and the first model is deleted slice by slice from near to far in the form of slicing.

In some embodiments, the second scene model includes a third model and a fourth model. The third model is a terrain model, and the fourth model is a model other than the terrain model. The second stage of the scene transformation includes generation processes of the third model and fourth model being gradually generated from near to far from the specified position, the generation process of the third model lagging behind the generation process of the fourth model.

Step 340. Gradually generate a third model from near to far using the specified position as the starting position while the first model is gradually deleted from near to far.

The third model is the terrain model in the second scene model.

A starting moment at which the third model is generated is equal to the starting moment at which the first model is deleted, and at the same time point, a position point at which the third model is generated the same as a position point at which the first model is deleted. Alternatively, the starting moment at which the third model is generated is later than the starting moment at which the first model is deleted.

That is, the terrain model in the second scene model is gradually newly constructed from near to far while the terrain model in the first scene model is gradually deleted from near to far, using the second wave as a dividing line. As shown in FIG. 6, the first model is deleted (an original terrain model is deleted) in the diffusion direction of the second wave 620, and at the same time, the third model is generated (a new terrain model is generated) in an opposite direction of the diffusion direction of the second wave 620.

The second scene model may be obtained by a terminal from a server and corresponds to a model in a scene transformation. The scene transformation includes a virtual scene picture determined based on a specified transformation sequence, or the scene transformation includes a virtual scene picture that is randomly determined.

Step 350. Gradually generate a fourth model from near to far using the specified position as the starting position to display a second virtual scene picture.

The fourth model is a model other than the terrain model in the second scene model.

That is, a second stage further includes a scene in which the fourth model is gradually generated from near to far using the specified position as the starting position. The starting moment at which the third model is generated is earlier than a starting moment at which the fourth model is gradually generated from near to far.

In some embodiments, the scene transformation may include: starting propagations of a first, a second, and a third waves from a specified position in the virtual scene by a respective time order and at a same diffusion speed; deleting non-terrain models in the first scene model slice by slice when a slice of the non-terrain models in the first scene model is in contact with the first wave; deleting terrain models in the first scene model slice by slice when a slice of the terrain models in the first scene model is in contact with the second wave; generating terrain models in the second scene model slice by slice when a slice of the terrain models in the second scene model locates at same position as the second wave; generating non-terrain models in the second scene model slice by slice when a slice of the non-terrain models in the second scene model locates at the same position as the third wave.

In some embodiments, the second stage includes a third wave. That is, in a process in which the fourth model is gradually generated from near to far, the third wave is displayed. The third wave is used for indicating a third boundary, and the third boundary is a boundary between a picture part in which the fourth model is not generated and a picture part in which the fourth model is generated. As shown in FIG. 6, a virtual scene picture that includes the second model and the first model, or a virtual scene picture that does not include the second model but includes the first model, or a virtual scene picture that does not include the second model and the first model but include third model is displayed in a diffusion direction of the third wave 630, and a virtual scene picture that includes the newly constructed fourth model and the third model is displayed in an opposite direction of the diffusion direction of the third wave 630.

In one embodiment, the fourth model is gradually generated from near to far at a third diffusion speed using the specified position as the starting position. The third diffusion speed is less than or equal to the second diffusion speed at which the second model is gradually deleted from near to far. That is, the second stage includes a scene in which the fourth model is gradually generated from near to far at the third diffusion speed using the specified position as the starting position.

In this embodiment of the present disclosure, the model in the first scene model needs to be deleted first before the model in the second scene model is generated. Therefore, to prevent model generation failure caused by an excessively fast generation speed, a speed of model generation needs to be controlled to be less than or equal to a speed of model deletion.

In one embodiment, when the three waves all reach the specified range, it is determined that the scene transformation is completed, and the second virtual scene picture that includes the second scene model is displayed.

The specified range may be preset. This is not limited in the present disclosure. When the three waves all reach the specified range, it indicates that the deletion of the first scene model is completed, generation of the models in the second scene model is completed, and a scene picture in a display interface of the terminal is transformed from the first virtual scene picture to the second virtual scene picture. The virtual animation picture includes a picture including both a partial picture in the first virtual scene picture and a partial picture in the second virtual scene picture during the virtual scene transformation process.

To ensure that a virtual object enters the new virtual scene, when the virtual scene transforms from the first virtual scene to the second virtual scene, a position of the virtual object in the first virtual scene is mapped to the second virtual scene to display the second virtual scene picture including the virtual object. Exemplarily, a process in which the position of the virtual object in the first virtual scene is mapped to the second virtual scene may be implemented as:

obtaining corresponding position coordinates of the virtual object in the first virtual scene; and correspondingly displaying the virtual object at the same position coordinates in the second virtual scene based on the position coordinates.

Figure 7:
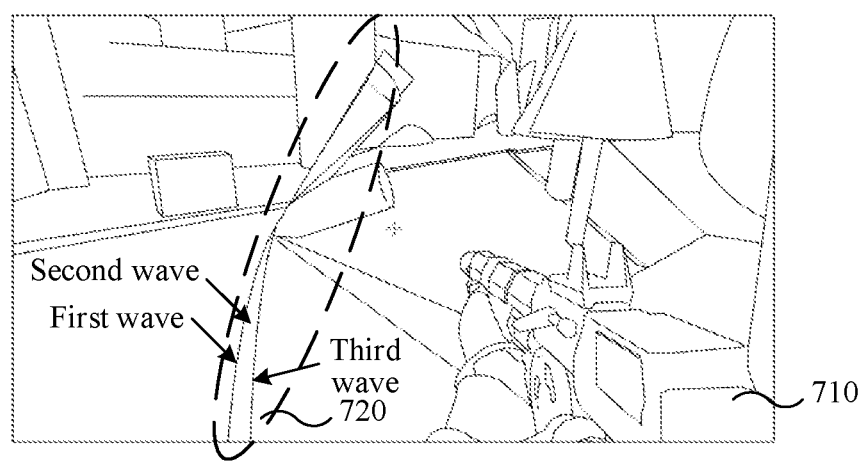
FIG. 7 is a schematic diagram of a virtual scene transformation process shown in an exemplary embodiment of the present disclosure.

For the virtual object, if the virtual object is at a junction of the virtual scene at a current moment, a transformation process of the virtual scene can be observed. FIG. 7 is a schematic diagram of a virtual scene transformation process shown in an exemplary embodiment of the present disclosure. As shown in FIG. 7, a virtual object 710 is at a wave boundary of the virtual scene transformation, a left side of the wave boundary is an original scene picture (a first scene picture), and a right side of the wave boundary is a new scene picture (a third scene picture). When a wave layer 720 continuously expand outward, the original scene picture on the left side of the wave layer 720 is deleted, and a new scene is generated on the right side of the wave layer 720. When the wave layer 720 reaches the wave boundary set in a system, the wave layer 720 disappears, and the scene transformation is completed. The wave layer includes a first wave, a second wave, and a third wave that are respectively used for implementing various stages of model deletion and model generation.

When the present disclosure is applied to a game scene, a plurality of modes including virtual prop transformation, virtual image transformation may be designed in combination with scene transformation, to urge a player to adjust equipment or tactics based on different scene transformation, which improves playability and repeatability of the game.

In summary, in the virtual scene transformation method provided in this embodiment of the present disclosure, in the same virtual game battle, when the virtual game battle meets the scene transformation condition, the currently displayed scene model is first gradually deleted, and during a process in which the currently displayed scene model is deleted or after the currently displayed scene model is deleted, a new scene model is gradually generated to display a new virtual scene picture. Therefore, when needing to perform virtual scene transformation, a user does not need to end the current virtual game battle and reselect a virtual scene type, which implements the virtual scene transformation in a single virtual game battle, simplifies an operation process of the virtual scene transformation, and improves efficiency of the virtual scene transformation.

In the method provided in this embodiment, a model other than the terrain model in the virtual scene are deleted first, and then the terrain model in the virtual scene is deleted, which avoids the problem that the other model cannot be displayed normally in the virtual scene after the terrain model is deleted, resulting in the distortion of the virtual scene, and improves accuracy of virtual scene switching.

In the method provided in this embodiment, during virtual scene switching, the first boundary is shown through the first wave and the second boundary is shown through the second wave, to indicate the deletion process of the first scene model in the virtual scene, which avoids the need for the user to repeatedly confirm deletion progress through an operation, and improves efficiency of human-computer interaction.

In the method provided in this embodiment, the first scene model is deleted and the second scene model is generated in the form of slicing, which reflects the process in which the first scene model is gradually deleted and the process in which the second scene model is gradually generated, thereby avoiding that the scene switching cannot be accurately perceived due to sudden scene switching, and improving effectiveness of scene presentation.

In the method provided in this embodiment, the second model in the virtual scene is further divided into a deletable sub-model and an undeletable sub-model, and a sub-model that does not need to be deleted is reserved, to avoid the need to obtain model data of the sub-model again in the second virtual scene, which reduces the data processing amount of the terminal and the server, and improves data processing efficiency.

In the method provided in this embodiment, the scene transformation process is performed when the scene transformation condition is met, so that the scene transformation is regular or triggering, which avoids the problem that some operations in a game process are cut off due to disorderly transformation and the player needs to repeat an operation, and improves efficiency of human-computer interaction.

Figure 8:
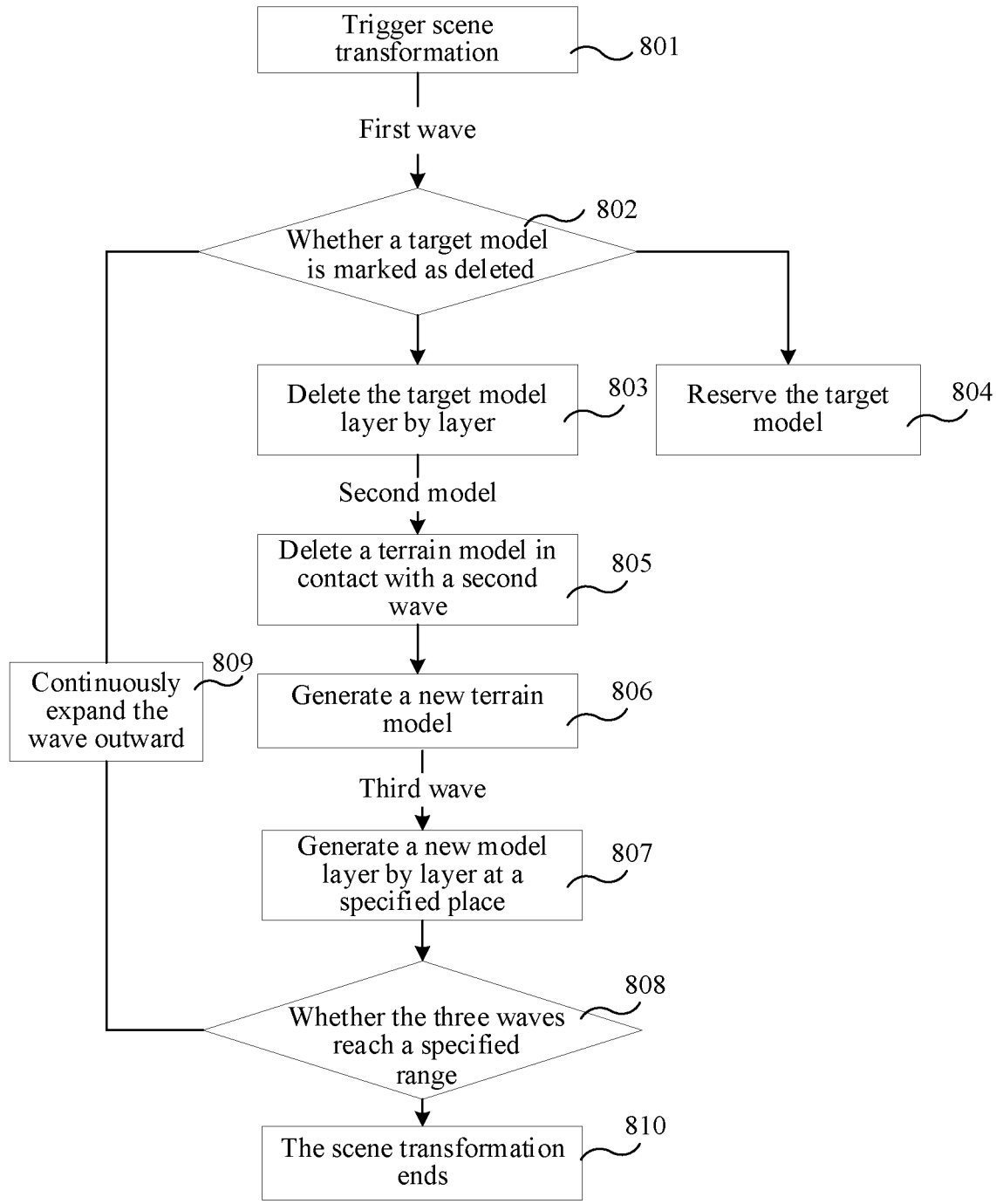
FIG. 8 is a flowchart of a virtual scene transformation process shown in an exemplary embodiment of the present disclosure.

FIG. 8 is a flowchart of a virtual scene transformation process shown in an exemplary embodiment of the present disclosure. The method is performed by a computer device, which may be implemented as a terminal, and the terminal may be the terminal 120 shown in FIG. 1. As shown in FIG. 8, the virtual scene transformation method includes the following steps:

Step 801. Trigger scene transformation.

When a virtual game battle meets a scene transformation condition, the scene transformation is triggered and three energy waves are generated. A certain time interval exists between different energy waves, and different energy waves diffuse in the same direction at corresponding diffusion speeds.

Step 802. Determine whether a target model is marked as deleted, if yes, step 803 is performed, otherwise, step 804 is performed.

The target model refers to a model that is in contact with a first wave.

When the target model is marked as deleted, it indicates that the target model is a deletable scene model in the virtual scene; and when the target model is not marked as deleted, it indicates that the target model is an undeletable scene model in the virtual scene.

Step 803. Delete the target model layer by layer.

In some embodiments, the target model is deleted in a form of slicing. That is, slicing is performed on the target model according to a wave direction, and various slices of the target model are deleted slice by slice in sequence according to the wave direction. The deleted slices disappear in the virtual scene and are not displayed.

In some embodiments, when the target model is deleted, the target model may be directly deleted from scene model data of the virtual scene, or the target model may be set in a transparent mode so as not to be displayed in the virtual scene.

Step 804. Reserve the target model.

When the target model is not marked as deleted, it indicates that the target model is undeletable, and the reserved target model is still displayed in the virtual scene.

Step 805. Delete a terrain model in contact with a second wave.

The second wave is used for indicating deletion progress of the terrain model. During gradual diffusion, the second wave is in contact with various terrain models, and the terrain models in contact with the second wave are deleted in a form of slicing.

Step 806. Generate a new terrain model.

After an original terrain model is deleted, a new terrain model is generated at a position of the deleted terrain model, so that objects in a new virtual scene are carried by the generated new terrain model.

Step 807. Generate a new model layer by layer at a specified place.

According to the position in which the scene model is located in the second virtual scene, the new model is generated layer by layer from near to far, to complete construction of the second virtual scene.

Exemplarily, a position a of the second virtual scene includes a scene model b, then when a wave of the generated scene model diffuses to the position a, the new scene model b is gradually generated in a form of slicing to construct the second virtual scene.

Step 808. Determine whether the three waves reach a specified range, if yes, step 809 is performed, otherwise, step 810 is performed.

When the three waves all reach the specified range, it indicates that the deletion of the first scene model and the generation of the second scene model are completed, so that the scene transformation is completed. When there is a wave in the three waves that does not reach the specified range, it indicates that the deletion of the first scene model and the generation of the second scene model are not completed, or the deletion of the first scene model is completed but the generation of the second scene model is not completed, then the wave is continued.

Step 809. Continuously expand the wave outward, and return to step 802.

Step 810. The scene transformation ends.

Figure 9:
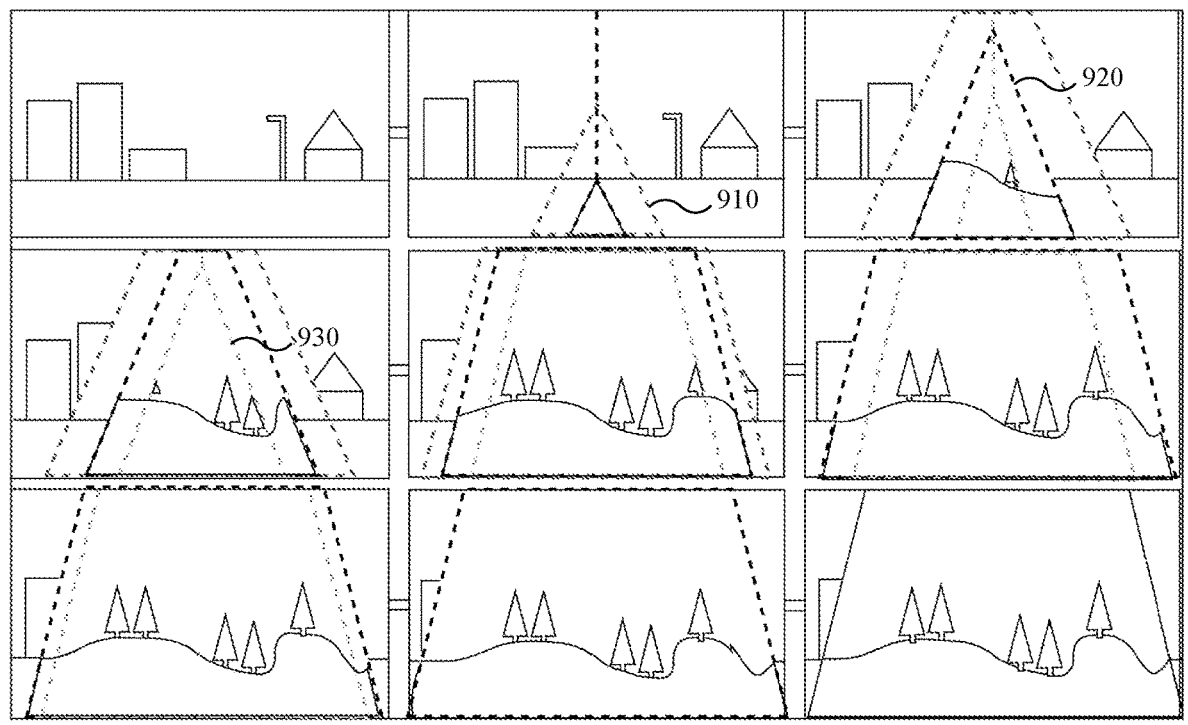
FIG. 9 is a schematic diagram of a virtual scene transformation process shown in an exemplary embodiment of the present disclosure.

Corresponding to the virtual scene transformation process shown in FIG. 8, FIG. 9 is a schematic diagram of a virtual scene transformation process shown in an exemplary embodiment of the present disclosure. The process is represented as follows: displaying a first virtual scene picture; and releasing, after a virtual game battle meets a scene transformation condition and triggers virtual scene transformation, three different energy waves in sequence using a specified position as a starting position. In FIG. 9, a diffusion manner of the energy waves is a triangle diffusion manner as an example. There is a certain time interval between different energy waves, and different waves correspond to different functions. As shown in FIG. 9, a first wave 910 is used for deleting a second model layer by layer, that is, all a model other than the terrain model in the virtual scene are deleted. A second wave 920 is used for deleting a first model layer by layer, and generating a third model at the same time, that is, an original terrain model in the virtual scene is deleted, and a new terrain model is added at the same time. The third wave 930 is used for generating a fourth model, that is, the new a model other than the terrain model are added onto the new terrain model until all the waves reach a wave boundary set in a system, to complete the virtual scene transformation. In the foregoing virtual scene transformation, whether the model in contact with the first wave 910 has a target identifier needs to be determined, to determine whether to delete the model.

In some embodiments, the wave from near to far from a specified position used in the scene transformation may include at least one edge surface that propagates along a path originating from the specified position. For example, as shown in FIG. 9, the waves 910, 920, and 930 each includes a conical edge surface of a cone whose axis is a center line of the scene. The propagating path of the edge surface may originate at the center of the base of the cone (i.e., the specified position) and extend along the radius of the base of the cone. It can be understood that the wave may include an edge surface having other suitable shape, such as a cylindrical surface, spherical surface, cubic surface, etc.

In summary, in the virtual scene transformation method provided in this embodiment of the present disclosure, in the same virtual game battle, when the virtual game battle meets the scene transformation condition, the currently displayed scene model is gradually deleted from near to far using the specified position as the starting position, and during a process in which the currently displayed scene model is deleted or after the currently displayed scene model is deleted, a new scene model is gradually generated from near to far to display a new virtual scene picture. Therefore, when needing to perform virtual scene transformation, a user does not need to end the current virtual game battle and reselect a virtual scene type, which implements the virtual scene transformation in a single virtual game battle, simplifies an operation process of the virtual scene transformation, and improves efficiency of the virtual scene transformation.

Figure 10:
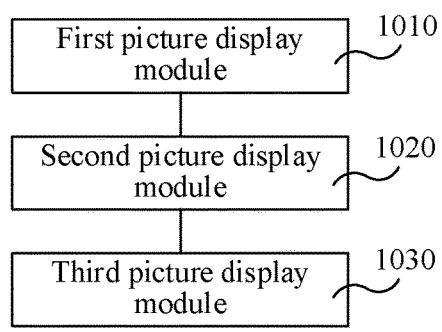
FIG. 10 is a block diagram of a virtual scene transformation apparatus shown in an exemplary embodiment of the present disclosure.

FIG. 10 is a block diagram of a virtual scene transformation apparatus shown in an exemplary embodiment of the present disclosure, and the virtual scene transformation apparatus includes:
- a first picture display module 1010, configured to display a first virtual scene picture, the first virtual scene picture including a first scene model in a virtual scene, and the first virtual scene picture being about the virtual scene observed by a virtual object;
- a second picture display module 1020, configured to display a scene transformation when the virtual game battle meets a scene transformation condition, the scene transformation including first stage in which the first scene model is gradually deleted using a specified position as a starting position, and a second stage in which the second scene model is gradually generated using the specified position as the starting position, a starting moment of the first stage being earlier than a starting moment of the second stage; and
- a third picture display module 1030, configured to display a second virtual scene picture when the scene transformation is completed, the second virtual scene picture including the second scene model.

In one embodiment, the first scene model includes a first model and a second model, the first model being a terrain model, and the second model being a model other than the terrain model.

The first stage includes a scene in which the second model is gradually deleted from near to far using a specified position as a starting position, and a scene in which the first model is gradually deleted from near to far using the specified position as the starting position, a starting moment at which the second model is deleted being earlier than a starting moment at which the first model is deleted.

In one embodiment, the first stage includes a first wave and a second wave,
the first wave being used for indicating a first boundary, the first boundary being a boundary between a picture part in which the second model is deleted and a picture part in which the second model is not deleted; and
the second wave being used for indicating a second boundary, the second boundary being a boundary between a picture part in which the first model is deleted and a picture part in which the first model is not deleted.

In one embodiment, the first stage includes a scene in which the second model is deleted layer by layer at a first diffusion speed, and a scene in which the first model is deleted layer by layer at a second diffusion speed, the second diffusion speed being less than or equal to the first diffusion speed.

In one embodiment, the second model includes at least one sub-model.

The first stage includes a scene in which the first sub-model is deleted layer by layer when the first sub-model is in contact with the first wave, the first sub-model being a sub-model in the at least one sub-model that meets a specified condition, the specified condition being used for indicating that the sub-model is deletable.

In one embodiment, the first stage includes a picture in which a second sub-model is reserved when the second sub-model is in contact with the first wave, the second sub-model being a sub-model in the at least one sub-model that does not meet the specified condition.

In one embodiment, the second scene model includes a third model and a fourth model, the third model being the terrain model in the second scene model; and the fourth model being a model other than the terrain model in the second scene model.

The second stage includes a scene in which the third model is gradually generated from near to far using the specified position as the starting position, and a scene in which the fourth model is gradually generated from near to far using the specified position as the starting position, where
a starting moment at which the third model is generated is the same as the starting moment at which the first model is deleted, and at the same time point, a position point at which the third model is generated is the same as a position point at which the first model is deleted;

and the starting moment at which the third model is generated is earlier than a starting moment at which the fourth model is generated.

In one embodiment, the second stage includes a third wave, the third wave being used for indicating a third boundary, the third boundary being a boundary between a picture part in which the fourth model is not generated and a picture part in which the fourth model is generated.

In one embodiment, the second stage includes a scene in which the fourth model is gradually generated from near to far at a third diffusion speed, the third diffusion speed being less than or equal to a first diffusion speed at which the second model is gradually deleted from near to far.

In one embodiment, the second model is deleted slice by slice from near to far in a form of slicing; and
the first model is deleted slice by slice from near to far in the form of slicing.

In one embodiment, the apparatus further includes:
a determining module, configured to determine, before displaying a virtual animation picture when the virtual game battle meets a scene transformation condition, that the virtual game battle meets the scene transformation condition when a running duration of a virtual scene corresponding to the first virtual scene picture reaches a duration threshold.

In one embodiment, the determining module is further configured to determine, before displaying a virtual animation picture when the virtual game battle meets a scene transformation condition, that the virtual game battle meets the scene transformation condition when a virtual object completes a specified task, the virtual object being used for indicating a movable object in the virtual scene.

In one embodiment, the apparatus further includes:
a mapping module, configured to map a position of the virtual object in the first virtual scene to the second virtual scene when the virtual scene is transformed from the first virtual scene to the second virtual scene; and display the second virtual scene picture including the virtual object.

In summary, in the virtual scene transformation apparatus provided in this embodiment of the present disclosure, in the same virtual game battle, when the virtual game battle meets the scene transformation condition, the currently displayed scene model is first gradually deleted, and during a process in which the currently displayed scene model is deleted or after the currently displayed scene model is deleted, a new scene model is gradually generated to display a new virtual scene picture. Therefore, when needing to perform virtual scene transformation, a user does not need to end the current virtual game battle and reselect a virtual scene type, which implements the virtual scene transformation in a single virtual game battle, simplifies an operation process of the virtual scene transformation, and improves efficiency of the virtual scene transformation.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 11:
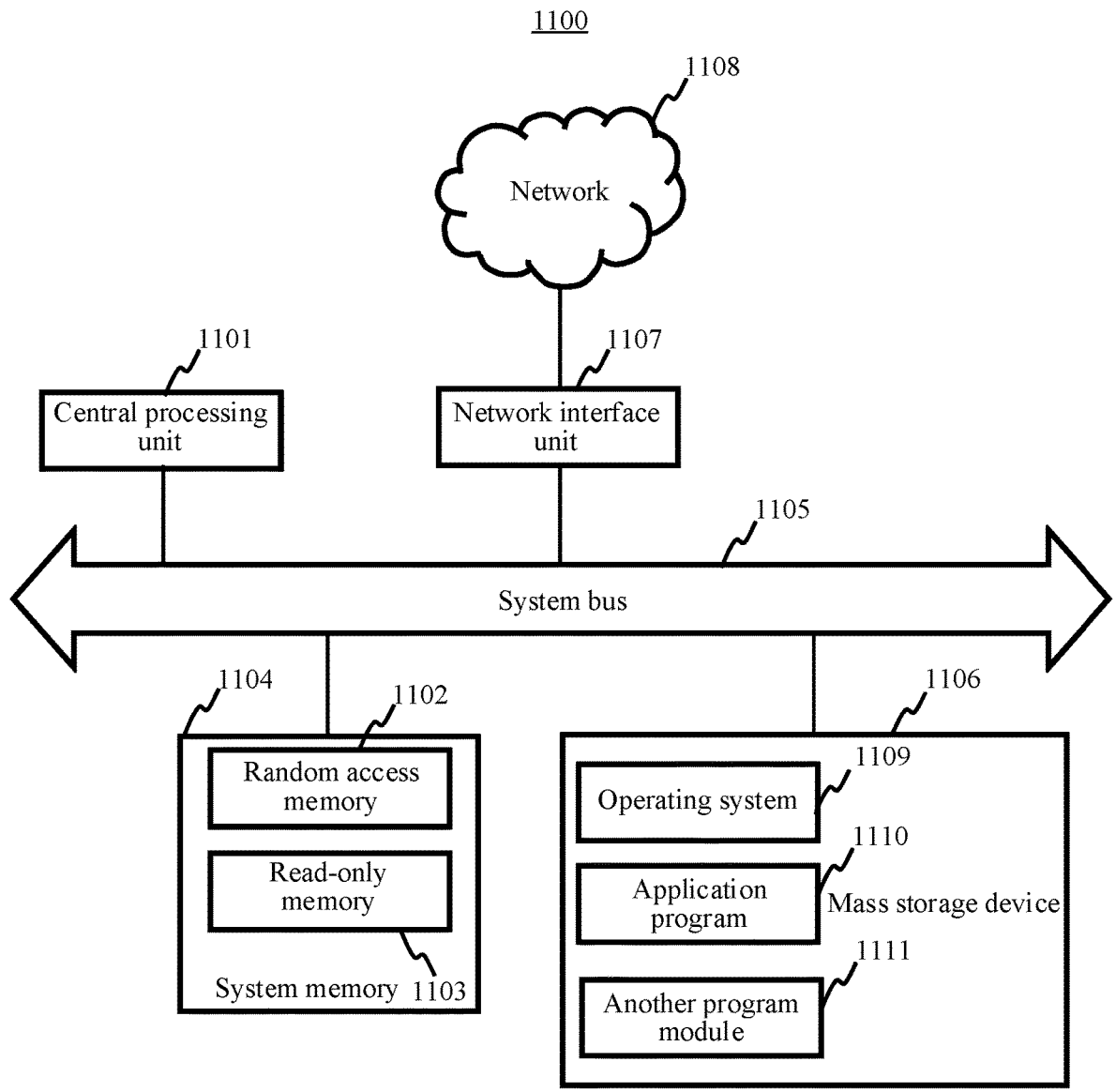
FIG. 11 is a structural block diagram of a computer device shown in an exemplary embodiment of the present disclosure.

FIG. 11 is a structural block diagram of a computer device 1100 shown in an exemplary embodiment of the present disclosure. The computer device may be implemented as a mini program backend server or a machine backend server in the foregoing solutions of the present disclosure. The computer device 1100 includes a central processing unit (CPU) 1101, a system memory 1104 including a random access memory (RAM) 1102 and a read-only memory (ROM) 1103, and a system bus 1105 connecting the system memory 1104 to the CPU 1101. The computer device 1100 further includes a mass storage device 1106 configured to store an operating system 1109, an application program 1110, and another program module 1111.

The mass storage device 1106 is connected to the CPU 1101 through a mass storage controller (not shown) connected to the system bus 1105. The mass storage device 1106 and an associated computer-readable medium provide non-volatile storage for the computer device 1100. That is, the mass storage device 1106 may include a computer-readable medium (not shown) such as a hard disk or a compact disc ROM (CD-ROM) drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the above. The foregoing system memory 1104 and mass storage device 1106 may be collectively referred to as a memory.

According to the embodiments of the present disclosure, the computer device 1100 may further be connected, through a network such as the Internet, to a remote computer on the network. That is, the computer device 1100 may be connected to a network 1108 through a network interface unit 1107 connected to the system bus 1105, or may be connected to another type of network or a remote computer system (not shown) by using the network interface unit 1107.

The memory further includes at least one instruction, at least one program, a code set, or an instruction set. The at least one instruction, the at least one program, the code set, or the instruction set is stored in the memory. The CPU 1101 executes the at least one instruction, the at least one program, the code set, or the instruction set to implement all or some steps in the virtual scene transformation methods shown in the foregoing embodiments.

Figure 12:
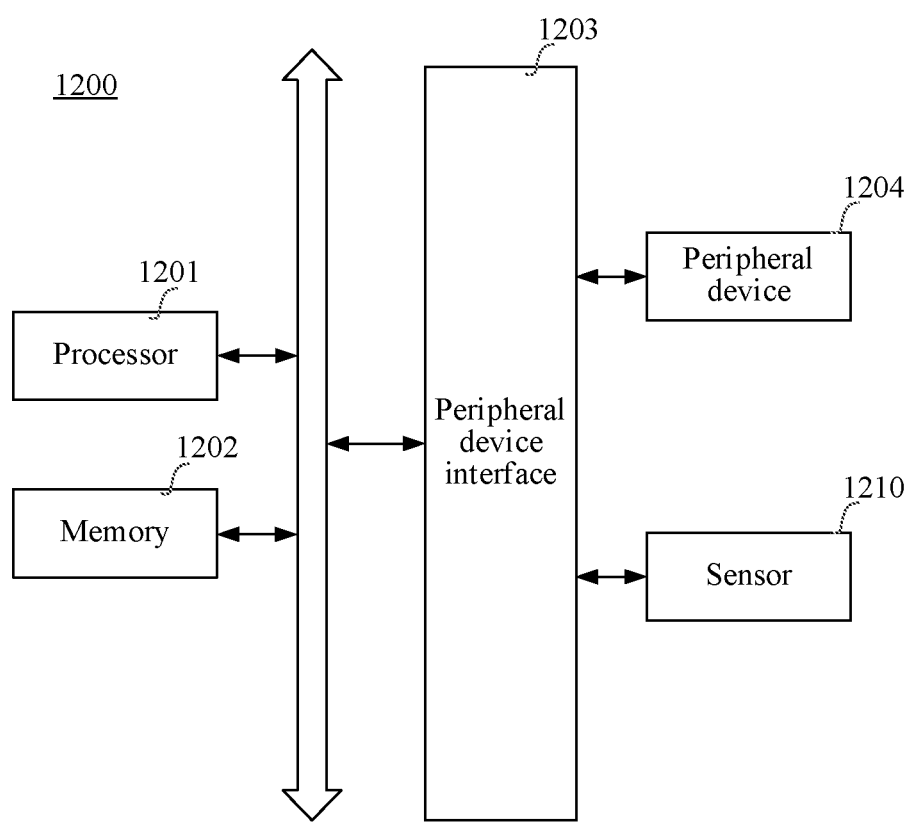
FIG. 12 is a structural block diagram of a computer device according to an exemplary embodiment of the present disclosure.

FIG. 12 is a structural block diagram of a computer device 1200 according to an exemplary embodiment. The computer device 1200 may be a terminal, for example, a smartphone, a tablet computer, a moving picture experts group audio layer III (MP3) player, a moving picture experts group audio layer IV MP4 player, a notebook computer, or a desktop computer. The computer device 1200 may be further referred to as another name such as user equipment, a portable terminal, a laptop terminal, or a desktop terminal.

Generally, the computer device 1200 includes: a processor 1201 and a memory 1202.

The processor 1201 may include one or more processing cores, and may be, for example, a 4-core processor or an 8-core processor. The processor 1201 may be implemented in at least one hardware form of digital signal processing (DSP), field programmable gate array (FPGA), and programmable logic array (PLA). The processor 1201 may also include a main processor and a coprocessor. The main processor is configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to be responsible for rendering and drawing content that a display needs to display. In some embodiments, the processor 1201 may further include an AI processor. The AI processor is configured to process a computing operation related to machine learning.

The memory 1202 may include one or more computer-readable storage media that may be non-transitory. The memory 1202 may further include a high-speed random access memory and a non-volatile memory, for example, one or more disk storage devices or flash storage devices. In some embodiments, the non-transitory computer-readable storage medium in the memory 1202 is configured to store at least one instruction, and the at least one instruction is configured to be executed by the processor 1201 to implement the virtual scene transformation method provided in the method embodiment of the present disclosure.

In some embodiments, the computer device 1200 may include: a peripheral device interface 1203 and at least one peripheral device 1204. The processor 1201, the memory 1202, and the peripheral device interface 1203 may be connected through a bus or a signal cable. Each peripheral device 1204 may be connected to the peripheral device interface 1203 through a bus, a signal line, or a circuit board. In some embodiments, the computer device 1200 further includes one or more sensors 1210. A person skilled in the art may understand that the structure shown in FIG. 12 does not constitute any limitation on the computer device 1200, and the computer device may include more components or fewer components than those shown in the figure, or some components may be combined, or a different component deployment may be used.

In an exemplary embodiment, a computer-readable storage medium is further provided, configured to store at least one instruction, at least one program, a code set, or an instruction set, the at least one instruction, the at least one program, the code set, or the instruction set being loaded and executed by a processor to implement all or some steps in the foregoing virtual scene transformation method. For example, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is further provided. The computer program product or the computer program includes computer instructions, the computer instructions being stored in the computer-readable storage medium. The processor of the computer device reads the computer instructions from the computer-readable storage medium, and executes the computer instructions, to cause the computer device to perform all or some steps of the method shown in any embodiment in FIG. 2, FIG. 3, or FIG. 8.

What is claimed is:

1. A virtual scene transformation method, applied to a computer device, the method comprising:
    displaying a first virtual scene picture, the first virtual scene picture comprising a first scene model in a virtual scene, and the first virtual scene picture being about the virtual scene observed by a virtual object controlled by the computer device;
    while the virtual scene is observed by the virtual object, displaying a scene transformation when the virtual scene meets a scene transformation condition, the scene transformation comprising a first stage in which the first scene model is gradually deleted, and a second stage in which a second scene model is gradually generated in the virtual scene, the second stage lagging behind the first stage; and
    displaying a second virtual scene picture when the scene transformation is completed, the second virtual scene picture comprising the second scene model.

2. The method according to claim 1, wherein the first scene model comprises a first model and a second model, the first model being a terrain model, and the second model being a model other than the terrain model;
    wherein the first stage of scene transformation comprises deletion processes of the first and second models being gradually deleted from near to far from a specified position, the deletion process of the first model lagging behind the deletion process of the second model.

3. The method according to claim 1, wherein the first stage comprises propagation of a wave from near to far from a specified position, the first scene model being gradually deleted comprises:
    determining a boundary based on the propagation of the wave; and
    deleting a slice of the first scene model reached by the boundary.

4. The method according to claim 3, wherein the wave comprises at least one edge surface that propagates along a path originating from the specified position.

5. The method according to claim 1, wherein the first scene model comprises at least one sub-model marked as undeletable, and the first stage comprises:
    preserving the at least one sub-model from being gradually deleted.

6. The method according to claim 1, wherein the second scene model comprises a third model and a fourth model, the third model being a terrain model, and the fourth model being a model other than the terrain model; and
    wherein the second stage comprises generation processes of the third model and fourth model being gradually generated from near to far from the specified position, the generation process of the third model lagging behind the generation process of the fourth model.

7. The method according to claim 1, further comprising:
    starting propagations of a first, a second, and a third waves from a specified position in the virtual scene by a respective time order and at a same diffusion speed;
    deleting non-terrain models in the first scene model slice by slice when a slice of the non-terrain models in the first scene model is in contact with the first wave;
    deleting terrain models in the first scene model slice by slice when a slice of the terrain models in the first scene model is in contact with the second wave;
    generating terrain models in the second scene model slice by slice when a slice of the terrain models in the second scene model locates at same position as the second wave; and generating non-terrain models in the second scene model slice by slice when a slice of the non-terrain models in the second scene model locates at the same position as the third wave.

8. The method according to claim 1, further comprising:
mapping a position of the virtual object from the first virtual scene to the second virtual scene when the virtual scene is transformed from the first virtual scene to the second virtual scene.

9. The method according to claim 1, wherein the scene transformation happens within a single round of virtual game battle.

10. A virtual scene transformation apparatus, comprising: at least one processor and at least one memory, the at least one memory storing at least one instruction, at least one program, a code set, or an instruction set, the at least one instruction, the at least one program, the code set, or the instruction set being loaded and executed by the at least one processor to perform:
displaying a first virtual scene picture, the first virtual scene picture comprising a first scene model in a virtual scene, and the first virtual scene picture being about the virtual scene observed by a virtual object controlled by the apparatus;
while the virtual scene is observed by the virtual object, displaying a scene transformation when the virtual scene meets a scene transformation condition, the scene transformation comprising a first stage in which the first scene model is gradually deleted, and a second stage in which a second scene model is gradually generated in the virtual scene, the second stage lagging behind the first stage; and
displaying a second virtual scene picture when the scene transformation is completed, the second virtual scene picture comprising the second scene model.

11. The apparatus according to claim 10, wherein the first scene model comprises a first model and a second model, the first model being a terrain model, and the second model being a model other than the terrain model; and
the first stage of scene transformation comprises deletion processes of the first and second models being gradually deleted from near to far from a specified position, the deletion process of the first model lagging behind the deletion process of the second model.

12. The apparatus according to claim 10, wherein the first stage comprises propagation of a wave from near to far from a specified position, the first scene model being gradually deleted comprises:
determining a boundary based on the propagation of the wave; and
deleting a slice of the first scene model reached by the boundary.

13. The apparatus according to claim 12, wherein the wave comprises at least one edge surface that propagates along a path originating from the specified position.

14. The apparatus according to claim 10, wherein the first scene model comprises at least one sub-model marked as undeletable, and the first stage comprises:
preserving the at least one sub-model from being gradually deleted.

15. The apparatus according to claim 10, wherein the second scene model comprises a third model and a fourth model, the third model being a terrain model, and the fourth model being a model other than the terrain model; and
the second stage comprises generation processes of the third model and fourth model being gradually generated from near to far from the specified position, the generation process of the third model lagging behind the generation process of the fourth model.

16. The apparatus according to claim 10, wherein the scene transformation comprises:
starting propagations of a first, a second, and a third waves from a specified position in the virtual scene by a respective time order and at a same diffusion speed;
deleting non-terrain models in the first scene model slice by slice when a slice of the non-terrain models in the first scene model is in contact with the first wave;
deleting terrain models in the first scene model slice by slice when a slice of the terrain models in the first scene model is in contact with the second wave;
generating terrain models in the second scene model slice by slice when a slice of the terrain models in the second scene model locates at same position as the second wave; and
generating non-terrain models in the second scene model slice by slice when a slice of the non-terrain models in the second scene model locates at the same position as the third wave.

17. The apparatus according to claim 10, wherein the at least one processor is further configured to perform:
mapping a position of the virtual object from the first virtual scene to the second virtual scene when the virtual scene is transformed from the first virtual scene to the second virtual scene.

18. The apparatus according to claim 10, wherein the scene transformation happens within a single round of virtual game battle.

19. A non-transitory computer-readable storage medium, storing at least one computer program, the at least one computer program being loaded and executed by at least one processor of a computing device to perform:
displaying a first virtual scene picture, the first virtual scene picture comprising a first scene model in a virtual scene, and the first virtual scene picture being about the virtual scene observed by a virtual object controlled by the computing device;
while the virtual scene is observed by the virtual object, displaying a scene transformation when the virtual scene meets a scene transformation condition, the scene transformation comprising a first stage in which the first scene model is gradually deleted, and a second stage in which a second scene model is gradually generated in the virtual scene, the second stage lagging behind the first stage; and
displaying a second virtual scene picture when the scene transformation is completed, the second virtual scene picture comprising the second scene model.

20. The storage medium according to claim 19, wherein the first scene model comprises a first model and a second model, the first model being a terrain model, and the second model being a model other than the terrain model; and
the first stage of scene transformation comprises deletion processes of the first and second models being gradually deleted from near to far from a specified position, the deletion process of the first model lagging behind the deletion process of the second model.

* * * * *